United States Patent
Won et al.

(10) Patent No.: US 7,721,102 B2
(45) Date of Patent: May 18, 2010

(54) SYSTEM AND METHOD FOR DETECTING EXPOSURE OF OCSP RESPONDER'S SESSION PRIVATE KEY

(75) Inventors: Dongho Won, Seoul (KR); Seungjoo Kim, Seoul (KR); Younggyo Lee, Suwon-si (KR)

(73) Assignee: Sungkyunkwan University Foundation for Corporate Collaboration, Suwon-si (KR)

( * ) Notice: Subject to any disclaimer, the term of this patent is extended or adjusted under 35 U.S.C. 154(b) by 1020 days.

(21) Appl. No.: 11/382,746

(22) Filed: May 11, 2006

(65) Prior Publication Data
US 2006/0288224 A1 Dec. 21, 2006

(30) Foreign Application Priority Data
Jun. 20, 2005 (KR) .................. 10-2005-0053226

(51) Int. Cl.
*H04L 29/06* (2006.01)
*H04L 9/32* (2006.01)
(52) U.S. Cl. .............. 713/175; 713/156; 713/173; 713/176; 713/181
(58) Field of Classification Search ............ 713/156, 713/173, 175, 176, 181
See application file for complete search history.

(56) References Cited
U.S. PATENT DOCUMENTS
2002/0165824 A1* 11/2002 Micali ............... 705/50
2005/0114653 A1* 5/2005 Sudia ............... 713/158

FOREIGN PATENT DOCUMENTS
KR  10-2000-0072218 A  12/2000
KR  10-2004-0037051 A  5/2004

OTHER PUBLICATIONS
Berbecaru, Diana. "MBS-OCSP: An OCSP based certificate revocation system for wireless environments", 2004 IEEE, pp. 267-272.*
Koga, Satoshi. "A Distributed Online Certificate Status Protocol with a Single Public Key", 2004, LNCS 2497, pp. 389-401.*

(Continued)

*Primary Examiner*—Michael J Simitoski
(74) *Attorney, Agent, or Firm*—Sughrue Mion, PLLC

(57) ABSTRACT

A system and method for detecting exposure of an OCSP responder's session private key in a D-OCSP-KIS to verify the status of a user's certificate online are provided. The system includes: a client for requesting certificate status information from the OCSP responder; the OCSP responder for receiving the certificate status information request from the client, sending a response, producing a hash value, and delivering the hash value to a certificate authority (CA) to get a certificate issued; and the CA for receiving the hash value from the OCSP responder and issuing the certificate to the OCSP responder in response to a certificate issue request; wherein the client verifies a digital signature using a hash value contained in the OCSP responder's certificate and the hash value contained in the response, and each client stores a counter value for a hash operation in each verification and recognizes the response as valid when a current counter value is greater than a previous counter value.

9 Claims, 6 Drawing Sheets

OTHER PUBLICATIONS

Munoz, Jose L. et al. "Certificate Revocation Policies for Wireless Communications", Proceedings of the IASTED International Conference, Communication Systems and Networks, Sep. 9-12, 2002, Malaga, Spain, pp. 427-432.*

Munoz, Jose L. et al. "Using OCSP to Secure Certificate-Using Transactions in M-commerce", ACNS 2003, LNCS 2846, pp. 280-292.*

Myers, M. et al. "X.509 Internet Public Key Infrastructure Online Certificate Status Protocol—OCSP" (RFC 2560), Jun. 1999.*

Yum, Dae Hyun et al. "A Distributed Online Certificate Status Protocol Based on GQ Signature Scheme", ICCSA 2004, LNCS 3043, pp. 471-480.*

* cited by examiner

SYSTEM AND METHOD FOR DETECTING EXPOSURE OF OCSP RESPONDER'S SESSION PRIVATE KEY

BACKGROUND OF THE INVENTION

1. Field of the Invention

The present invention relates to an online certificate status protocol (OCSP) for verifying a certificate of a user online in a public key infrastructure (PKI), and more particularly, to a system and method for detecting exposure of an OCSP responder's session private key in a distributed OCSP based on key-insulted signature (D-OCSP-KIS) where multiple OCSP responders exist.

2. Description of the Related Art

Various cryptographic algorithms have been developed for security on the Internet. A cryptographic algorithm requires a confidentiality function for keeping information secret, a function for performing authentication to identify a person who sends information, a function for checking the integrity of information, and a non-repudiation function for preventing denial of the fact that an information provider provides information.

As a cryptographic algorithm having such functions, a cryptographic algorithm using a key has been widely used. The key-based cryptographic algorithm includes a symmetric encryption algorithm or a secret key algorithm which uses a single secret key, and an asymmetric encryption algorithm or a public key algorithm which uses a combination of a public key and a private key. A message digest (MD), which is not a cryptographic algorithm, is used to check integrity of received information and to perform authentication for an information sender.

The symmetric encryption algorithm is an algorithm in which a decryption key is derived from an encryption key and vice versa, and performs both encryption and decryption using a single secret key. A person who sends information or a message encrypts the information or message using a secret key and then sends the encrypted information, and a person who receives the encrypted information decrypts the encrypted information using the same secret key. The symmetric encryption algorithm has an advantage in that it can perform encryption and decryption rapidly, and can employ various encryption techniques and thus has many applications. On the other hand, it has a disadvantage in that it is difficult to produce and manage a secret key when there are many users and safe transmission of the secret should be guaranteed. Symmetric encryption algorithms include Data Encryption Standard (DES), International Data Encryption Algorithm (IDEA), RC2, RC5, SEED, and so on.

The public key encryption algorithm uses an encryption key and a decryption key which are different from each other. That is, an encryption key cannot be derived from a decryption key, and vice versa. The public key encryption algorithm uses a public key which is a combination of an encryption key and a private key. Since the public key is open to the public, a sender encrypts desired information using a receiver's public key and then sends the encrypted information, and a receiver decrypts the encrypted information using his/her private key. Ciphertext can be decrypted using a private key corresponding to a public key used for encryption, it does not require transmission of a secret key. However, the public key encryption algorithm is slow to encrypt and decrypt and thus is inconvenient when encrypting and decrypting large volumes of information. Public key infrastructure (PKI) encryption algorithms include Rivest-Shamir-Adelman (RSA), LUC, Diffie-Hellman, Elliptic Curve, and so on.

Meanwhile, the message digest algorithm is used to secure the integrity of information as described above. The message digest algorithm converts given information or a message into a hash value having a predetermined length using a one-way hash function. The ciphertext is transmitted together with the message digest, and a receiver decrypts it into plaintext and obtains a hash value of the plaintext, and then compares the obtained hash value to the received hash value. When the two hash values are identical, it means that there is no change in information during transmission. Message digest algorithms include Snefru, CRC-32, CRC-16, MD2, MD4, MD5, SHA, Haval, and so on.

The type of cryptographic algorithm most widely used in electronic commercial transactions is a hybrid type which is a mix of both asymmetric and symmetric encryption. In the hybrid type cryptographic algorithm, a message is encrypted by the secret key algorithm using a secret key, and the secret key is encrypted by the public key algorithm using a receiver's public key, and then the two ciphertexts are transmitted. The receiver decrypts the secret key using his/her private key and then decrypts the message using the decrypted secret key. For authentication, integrity and non-repudiation, something encrypted by a private key of a sender who sends the message digest (which is referred to as a "digital signature") is generally transmitted together. The receiver decrypts the message digest using the sender's public key and then compares it with a message digest of the decrypted plaintext, thereby authenticating the sender and achieving content integrity and non-repudiation.

The above-described cryptographic algorithm is disclosed in Korean Publication No. 2000-72218, entitled: "METHOD FOR MANAGING AND SYNCHRONIZING SECURITY DATA IN INTERNET USING ENCRYPTION AND DIGITAL SIGNITURE" and Korean Publication No. 2004-37051, entitled: "DOCUMENT SECURITY SYSTEM AND METHOD FOR THE SAME AND RECORDING MEDIUM FOR EXECUTING THE PROGRAM CAPABLE OF READING COMPUTER".

The PKI encryption algorithm described above provides extensive security such as authentication, integrity, and non-repudiation by using the public key algorithm. A main feature of the PKI encryption algorithm is the digital certificate in which identify information of an entity such as a user or an organization is linked to its public key and then digitally signed by a certificate authority (CA). When a private key of an entity or entity information is exposed, the entity requests the CA to revoke its certificate. Information indicating whether a certificate is revoked or not is referred to as certificate status information (CSI), and a certificate revocation list (CRL) is one well-known method for obtaining and managing CSI.

The CRL is simple, but the cost of communications between a user and a CA's directory or repository is high. For this reason, several methods have been suggested to reduce the size and cost of communicating CSI, such as a delta-CRL, CRL Distributed Points (CRL DPs), Over-issued CRLs, Indirect CRLs, Dynamic CRL DPs, Freshest CRLs, Certificate Revocation Trees (CRTs), NOVOMODO, and Authenticated Directory.

When a client or a user wants the CSI in a timely manner, an online certificate status detecting method such as OCSP is more convenient than an offline method such as the CRL.

Using the OCSP, the client does not need to download the CRL from the directory of the CA, so that the communication cost is low and the client does not need a memory for storing the CRL. However, if the CSI requests are centralized to one OCSP responder, the OCSP responder may be attacked by a denial of service (DoS). To reduce the risk of a DoS attack, the OCSP responder may compute a signature value for responses in a short time. However, this may also result in replay attacks.

In order to reduce overload of one OCSP responder in the traditional OCSP, a distributed-OCSP (D-OCSP) in which multiple OCSP responders coexist has been introduced. If distributed OCSP responders have the same private key in the D-OCSP, an risk of exposure of the private key becomes very high. Thus, each OCSP responder has a different private key, and a client should obtain certificates of all OCSP responders to detect the CSI of the OCSP responders. However, this may also result in a high communication cost and increased memory consumption. In order to solve these problems, a single public key method in D-OCSP-KIS was proposed by Koga and Sakurai.

In D-OCSP-KIS, each OCSP responder has a different private key, but they all have the same certificate. Thus, the number of certificates is reduced, a communication cost is low, a computation time is short, and memory consumption is low.

However, the D-OCSP-KIS has several problems. If an attacker obtains a session private key of an OCSP responder within a certain time period (e.g., one day), the private key of a different OCSP responder cannot be computed without a master private key. Since a hash value is impossible to compute reversely, a hash value of a previous time period cannot be computed. However, the attacker may pretend to be an OCSP responder while the real OCSP responder does not recognize, and may send a wrong response to a client using a snatched hash value. As a result, both a user and an electronic commerce server are vulnerable to serious damage. In addition, computation, storage and distribution of a hash chain may be a load on the CA.

That is, the D-OCSP-KIS verifies a certificate status such that the CA issues an OCSP responder's certificate having a hash value which indicates whether the OCSP responder's certificate is valid or not each time period (e.g., one day). However, when the session private key is secretly exposed to the attacker during a certain time period, the attacker can disguise himself or herself as the OCSP responder to snatch the hash value and send a wrong response to the client using the snatched has value, thereby causing bad damage to the electronic commerce server and its users.

SUMMARY OF THE INVENTION

It is an objective of the present invention to provide a system and method for detecting exposure of an OCSP responder's session private key, whereby exposure of an OCSP responder's session private key and abuse of a snatched hash value can be detected in the D-OCSP-KIS.

It is another objective of the present invention to provide a system and method for detecting exposure of an OCSP responder's session private key, whereby it is possible to detect whether an attacker has secretly obtained an OCSP responder's session private key and sent a wrong response to a client using a snatched hash value.

It is still another objective of the present invention to provide a system and method for detecting exposure of an OCSP responder's session private key, whereby each hash value is used just once for verifying an OCSP responder's certificate and overload for production and distribution of a hash chain in a CA is decentralized to each OCSP responder.

One aspect of the present invention provides a system for detecting exposure of an OCSP responder's session private key in a D-OCSP-KIS to verify the status of a user's certificate online, comprising: a client for requesting certificate status information from the OCSP responder; the OCSP responder for receiving the certificate status information request from the client, sending a response, producing a hash value, and delivering the hash value to a certificate authority (CA) to get a certificate issued; and the CA for receiving the hash value from the OCSP responder and issuing the certificate to the OCSP responder in response to a certificate issue request; wherein the client verifies a digital signature using a hash value contained in the OCSP responder's certificate and the hash value contained in the response, and each client stores a counter value for a hash operation in each verification and recognizes the response as valid when a current counter value is greater than a previous counter value.

Another aspect of the present invention provides a method for detecting exposure of an OCSP responder's session private key in a D-OCSP-KIS to verify the status of a certificate online in a system in which a plurality of clients, a certificate authority (CA), and a plurality of OCSP responders are connected via a network, comprising the steps of: computing a hash value at each OCS responder; issuing the OCSP responder's certificate at the CA; and verifying the status of the OCSP responder's private key at the client, wherein each client verifies a digital signature using a hash value contained in the OCSP responder's certificate and a hash value contained in a response, and each client stores a counter value for a hash operation in each verification and recognizes the response as valid when a current counter value is greater than a previous counter value.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Hereinafter, exemplary embodiments of the present invention will be described in more detail with reference to the accompanying drawings. In the following description, a detailed description of known functions and configurations incorporated herein has been omitted for conciseness.

In this specification, n denotes the total number of OCSP responders, m denotes the total number of clients, and n is much less than m (n<<m).

It is assumed that an end user receives a CSI service through a client and the client registers with a CA before receiving the CSI service from an OCSP responder.

Figure 1:
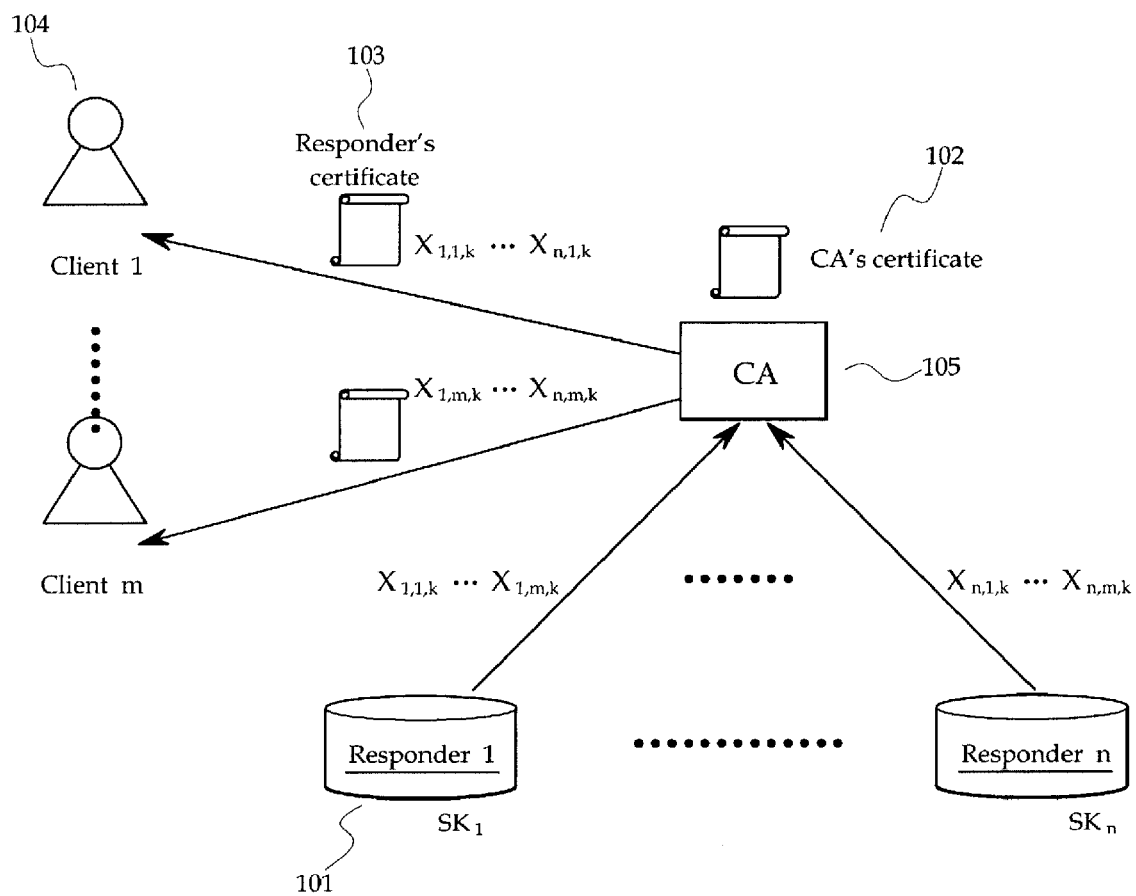
FIG. 1 is a diagram illustrating a system configuration for computing a hash value and issuing an OCSP responder's certificate according to an exemplary embodiment of the present invention.
Figure 2:
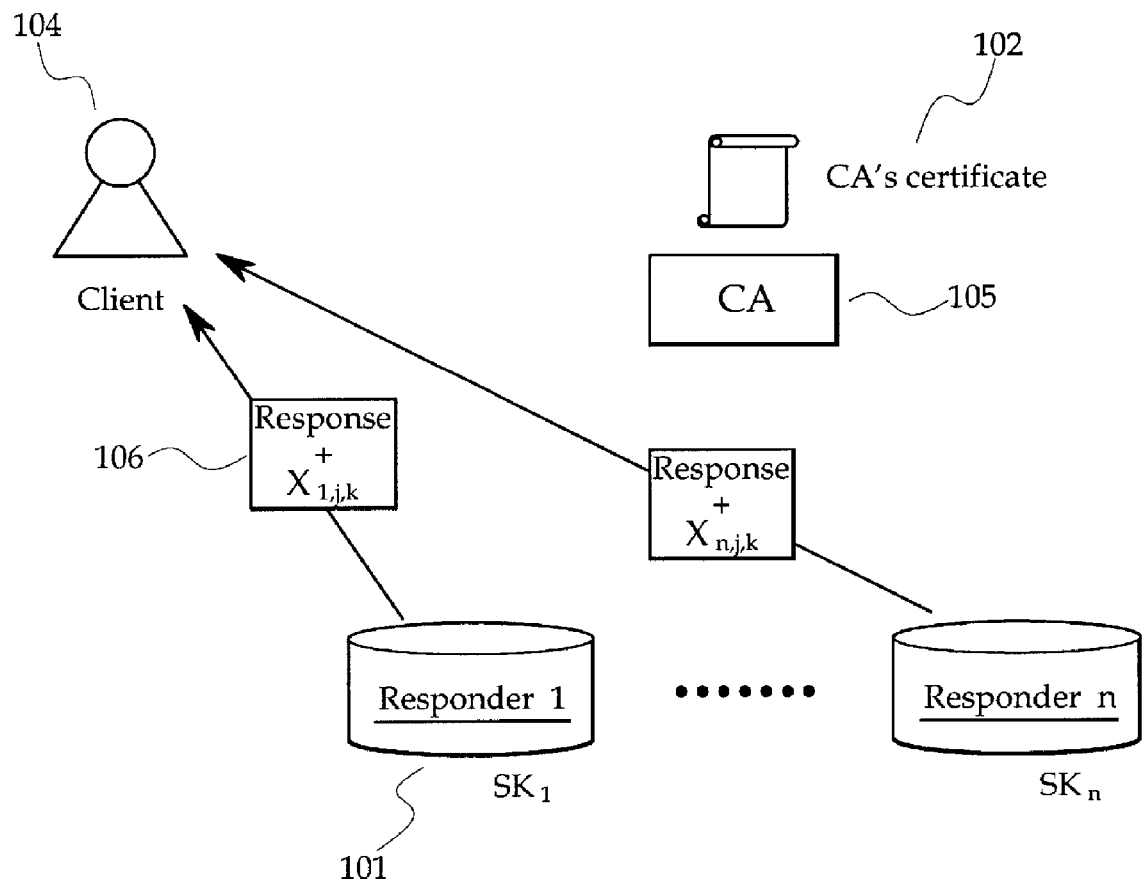
FIG. 2 is a diagram illustrating a system configuration for exchanging a response and a hash value between OCSP responders and clients 104 according to an exemplary embodiment of the present invention.

FIG. 1 is a diagram illustrating a system configuration for computing a hash value and issuing an OCSP responder's certificate according to an exemplary embodiment of the present invention, and FIG. 2 is a diagram illustrating a system configuration for exchanging a response and a hash value between OCSP responders and clients according to an exemplary embodiment of the present invention.

As shown in FIGS. 1 and 2, the system of the present invention comprises a CA 105, OCSP responders 101, and clients 104 which are connected through a network.

The CA 105 receives and checks a PKI user certificate issue request and issues a certificate according to a PKI security policy. The CA 105 renews or revokes a certificate if needed and notifies clients at various locations. The CA 105 also records all certificates and transaction information in a database.

As an initial task, the OCSP responder 101, in order to have its own certificate issue, computes and stores a hash value and then transmits a final value to the CA 105. The CA 105 collects the hash value received from the OCSP responder 101 and issues a certificate 103 for the OCSP responder using its private key. The issued certificate of the OCSP responder is transmitted to the corresponding client. The hash values contained in the certificates transmitted to the clients are different from each other.

The user requests certificate status information (CSI) from the OCSP responder through the client 104 in order to receive a CSI service. The OCSP responder checks the CSI request received from the client 104 and returns a corresponding hash value to the client together with a response. The client 104 receives the response from the OCSP responder 101 and compares the hash value contained in the response with the hash value contained the OCSP responder's certificate 103 issued from the CA 105 to verify the status of the OCSP responder's certificate 103. At this time, a counter value for hash operation is increased by "1". If a current counter value is greater than a previous counter value, the client 104 recognizes that the response is valid and thus accepts the response. Otherwise, the client 104 recognizes that the session private key of the OCSP responder 101 is exposed and the hash value is abused and thus rejects the response.

A method for detecting exposure of the OCSP responder's session private key according to an exemplary embodiment of the present invention is explained below in detail.

Figure 3:
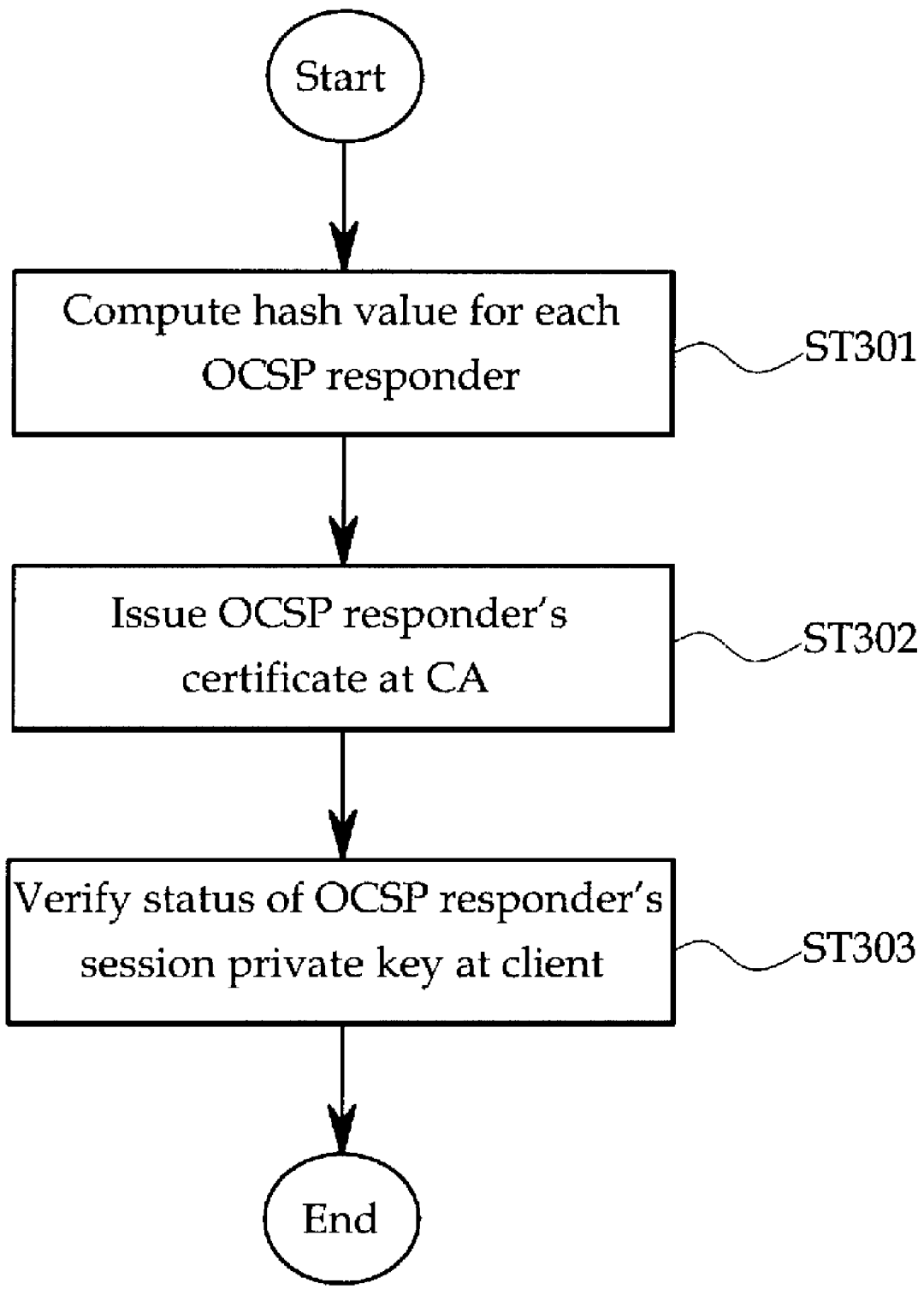
FIG. 3 is a flowchart illustrating a method for detecting exposure of an OCSP responder's session private key according to an exemplary embodiment of the present invention.

FIG. 3 is a flowchart illustrating a method for detecting exposure of the OCSP responder's session private key according to an exemplary embodiment of the present invention.

As shown in FIG. 3, the method for detecting exposure of the OCSP responder's session private key in the D-OCSP-KIS comprises a procedure for computing a hash value for each OCSP responder 101 (ST301), a procedure for issuing the OCSP responder's certificate 103 at the CA 105 (ST302), and a procedure for verifying the status of the OCSP responder's session private key at the client 104 (ST303).

Figure 4:
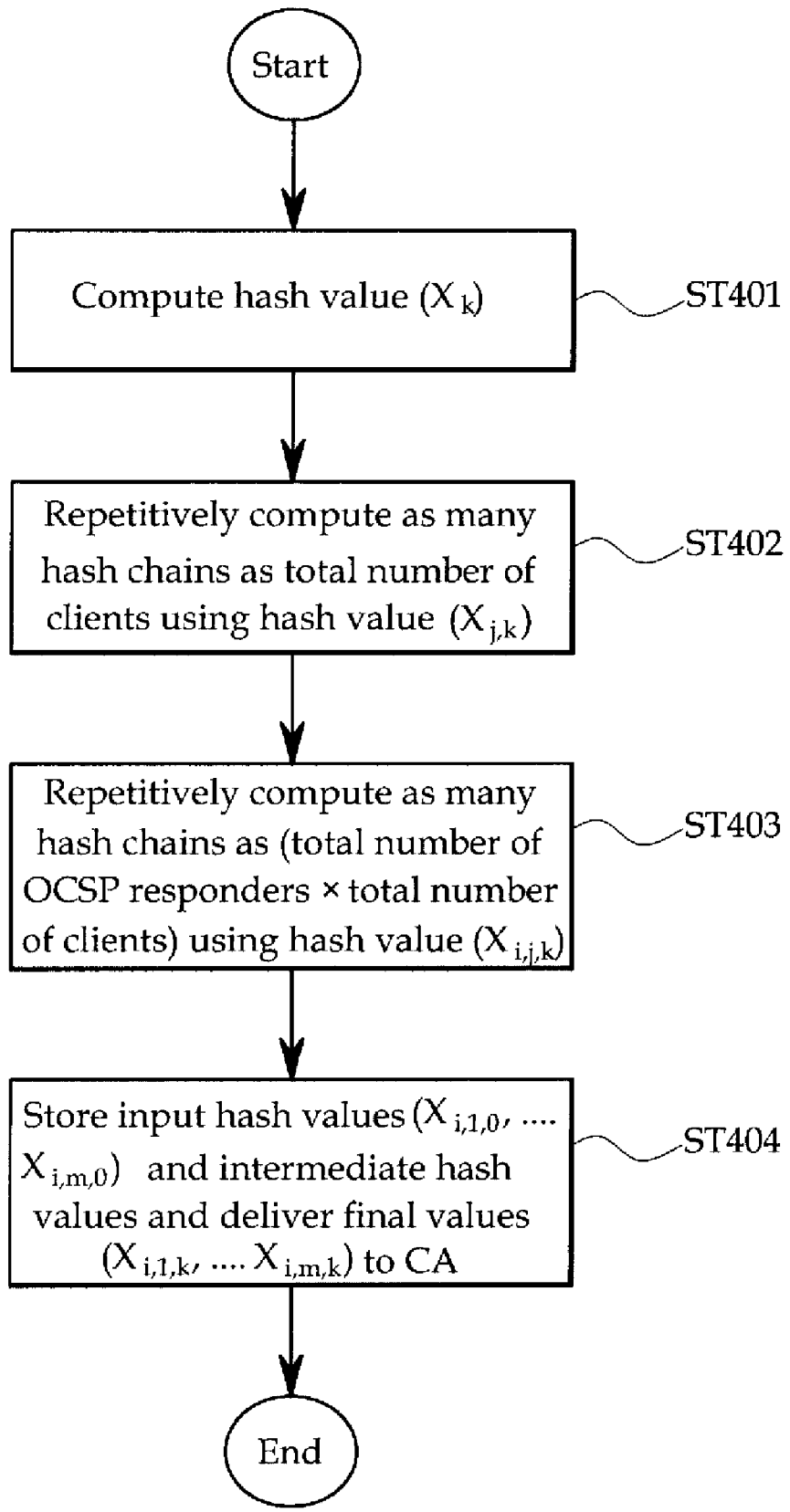
FIG. 4 is a flowchart illustrating a procedure for computing a hash value for each OCSP responder according to an exemplary embodiment of the present invention.

FIG. 4 is a flowchart illustrating the procedure for computing the hash value for each OCSP responder according to an exemplary embodiment of the present invention.

K is the total number of times a signature is used by one OCSP responder 101. For example, if each OCSP responder's certificate 103 expires after 10,000 signature operations for responses, K is 10,000. Thus, the OCSP responder's certificate 103 is revoked after 10,000 signature operations. The OCSP responder 101 can compute a hash value $X_K$ using the following h (ST401):

$$X_0 \xrightarrow{h} X_1 \xrightarrow{h} X_2 \xrightarrow{h} \ldots X_k \ldots \xrightarrow{h} X_K$$

The OCSP responder 101 repetitively computes m hash chains as different input values $X_{j,0}$ for m clients 104 (ST402). $X_{j,k}$ denotes a hash value of a time k for verification in a client j.

$$X_{1,0} \xrightarrow{h} X_{1,1} \xrightarrow{h} X_{1,2} \xrightarrow{h} \ldots X_{1,k} \ldots \xrightarrow{h} X_{1,K}$$

$$\vdots$$

$$X_{m,0} \xrightarrow{h} X_{m,1} \xrightarrow{h} X_{m,2} \xrightarrow{h} \ldots X_{m,k} \ldots \xrightarrow{h} X_{m,K}$$

Each OCSP responder 101 repetitively computes n×m hash chains as different input values $X_{i,j,0}$ (ST403). $X_{i,j,k}$ denotes a hash value of a time k computed in an OSCP responder i for distribution to the client j.

$$X_{1,1,0} \xrightarrow{h} X_{1,1,1} \xrightarrow{h} X_{1,1,2} \xrightarrow{h} \ldots X_{1,1,k} \ldots \xrightarrow{h} X_{1,1,K} \quad \text{In } OCSP$$

responder 1

$$\vdots$$

$$X_{1,m,0} \xrightarrow{h} X_{1,m,1} \xrightarrow{h} X_{1,m,2} \xrightarrow{h} \ldots X_{1,m,k} \ldots \xrightarrow{h} X_{1,m,K}$$

$$\vdots$$

$$X_{i,j,k} \quad \text{In } OCSP$$

responder j $$\vdots$$

$$X_{n,1,0} \xrightarrow{h} X_{n,1,1} \xrightarrow{h} X_{n,1,2} \xrightarrow{h} \ldots X_{n,1,k} \ldots \xrightarrow{h} X_{n,1,K}$$

$$\vdots$$

$$X_{n,m,0} \xrightarrow{h} X_{n,m,1} \xrightarrow{h} X_{n,m,2} \xrightarrow{h} \ldots X_{n,m,k} \ldots \xrightarrow{h} X_{n,m,K} \quad \text{In } OCSP$$

responder n

Next, each OCSP responder 101 stores the input values $X_{i,1,0}, \ldots, X_{i,m,0}$ and all intermediate hash values and securely delivers the final values $X_{i,1,K}, \ldots, X_{i,m,K}$ to the CA 105 (ST404).

The procedure for issuing the OCSP responder's certificate 103 at the CA 105 is explained below.

First, the CA 105 gathers the final values $X_{i,1,K}, \ldots, X_{i,m,K}$ from each OCSP responder 101 and issues m OCSP responder's certificates $C_{client\_j}$ for distribution to the clients 104 using its own private key. SN denotes a serial number of the certificate, V denotes a validity period, and I and S respectively denote an issuer and an owner of the certificate. Here, the hash value contained each certificate 103 is unique. The certificates to be distributed to the m clients 104 are as follows:

$C_{client_1} = Sig_{K_{CA}}(PK_{res}, SN, I, S, V, X_{1,1,K}, \ldots, X_{n,1,K})$
Certificate for client 1

$C_{client_m} = Sig_{K_{CA}}(PK_{res}, SN, I, S, V, X_{1,m,K}, \ldots, X_{n,m,K})$
Certificate for client m Next, the procedure for verifying the status of the private key at the client will be described with reference to FIG. 5.

Figure 5:
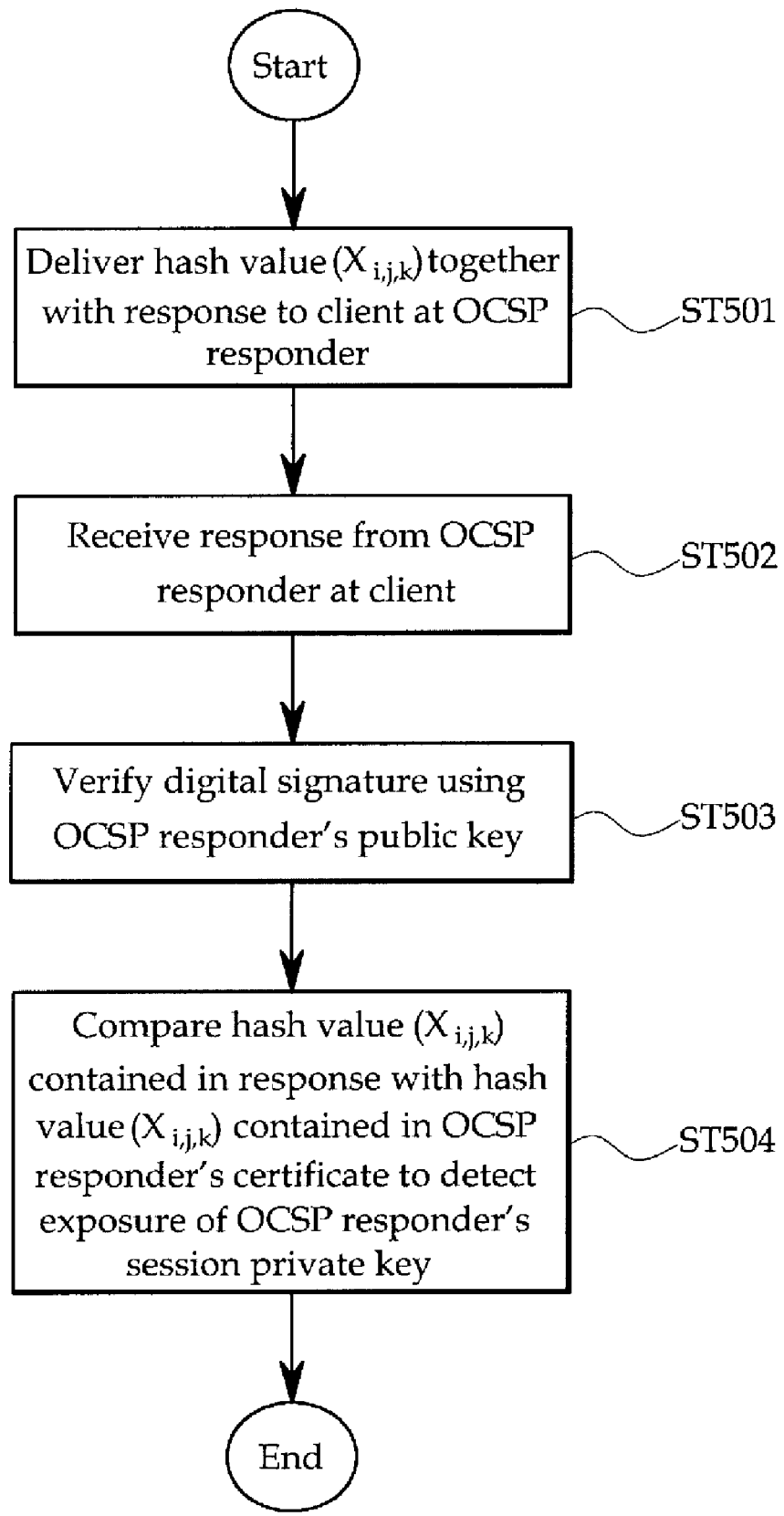
FIG. 5 is a flowchart illustrating a procedure for verifying the status of an OCSP responder's session private key at a client according to an exemplary embodiment of the present invention.

FIG. 5 is a flowchart illustrating the procedure for verifying the status of the OCSP responder's session private key at the client according to an exemplary embodiment of the present invention.

When the OCSP responder i delivers a response to the client j, a hash value $X_{i,j,k}$ is transmitted together (ST501). The OCSP responder 101 delivers a hash value $X_{i,j,k-1}$ to the client with a first response and a hash value $X_{i,j,k-2}$ with a second response. In this way, a hash value $X_{i,j,0}$ is delivered with the last response.

$<X_{i,j,k}, R, Sig_{SK_i}(R)>$At the first response to client j $<X_{i,j,K-1}, R, Sig_{SK_i}(R)>$At the k-th response to client j $<X_{i,j,0}, R, Sig_{SK_i}(R)>$At the last response to client j When the client j receives the response from the OCSP responder i (ST502), the client 104 verifies a digital signature using the OCSP responder's public key $PK_{res}$ (ST503). At this time, the client 104 verifies the status of the OCSP responder's certificate 103 using the hash value $X_{i,j,k}$ received together with the response and the hash value $X_{i,j,k}$ contained in the OCSP responder's certificate 103 (ST504). In more detail, the client 104 can check the validity of a private key $SK_i$ by performing a hash function once at the first response, and by performing a hash function twice at the second response. The client performs the hash function k times to check the status validation of the OCSP responder's private key at the last response. Thus, the client 104 performs the hash function an average of K/2 times (here, 5,000 times) to check the validity status of the OCSP responder 101's private key.

$X_{i,j,K} = h(X_{i,j,K-1})$ At the first response $X_{i,j,K} = h^k(X_{i,j,K-k})$ At the K-th response $X_{i,j,K} = h^K(X_{i,j,0})$ At the last response The client stores a counter value k at each response and compares it with a previous counter value at a previous response. If a current counter value is greater than a previous counter value ($C_{now} == C_{before}+1$), the client 104 recognizes it as meaning that the response is valid. Otherwise, the client 104 recognizes it as indicating exposure of the session private key and abuse of the hash value.

Next, the procedure for detecting exposure of the session key at the client will be described with reference to FIG. 6.

Figure 6:
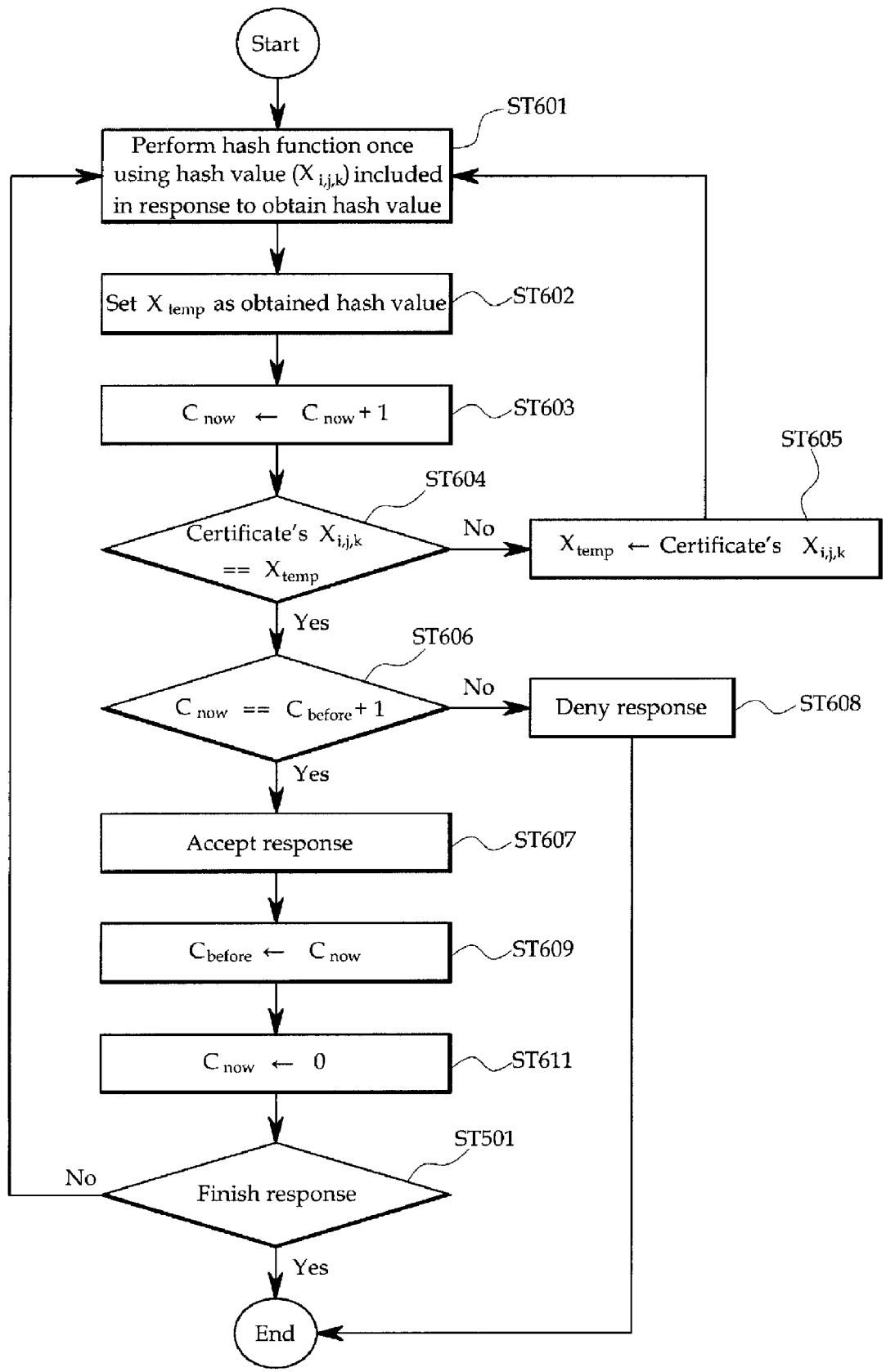
FIG. 6 is a flowchart illustrating a procedure for detecting exposure of an OCSP responder's session private key at a client according to an exemplary embodiment of the present invention.

FIG. 6 is a flowchart illustrating the procedure for detecting exposure of the OCSP responder's session private key at the client according to an exemplary embodiment of the present invention.

The client 104 performs a hash function once using the hash value $X_{i,j,k}$ included in the response to obtain a hash value (ST601), sets $X_{temp}$ as the obtained hash value (ST602), and increases the counter $C_{now}$ by 1 (ST603).

$X_{temp} \leftarrow h(X_{i,j,k})$ $C_{now} \leftarrow C_{now}+1$

The client then compares $X_{temp}$ with $X_{i,j,k}$ contained in the OCSP Responder i's certificate (ST604). If $X_{temp}$ is identical to $X_{i,j,k}$, it goes to ST606. Otherwise, the client sets $X_{i,j,k}$ to $X_{temp}$ and it goes back to ST601 (ST605).

$X_{i,j,k} \leftarrow X_{temp}$

The client 104 checks if $C_{now} == C_{before}+1$ is satisfied or not (ST606). If $C_{now} == C_{before}+1$ is satisfied, then the client accepts the response (ST607). Otherwise, the client rejects the response (ST608).

$C_{now} == C_{before}+1$

Finally, the client 104 sets $C_{now}$ as $C_{before}$ (ST609) and "0" as $C_{now}$ (ST610), and then the client goes back to S601 to process the next response.

$C_{before} \leftarrow C_{now}$ $C_{now} \leftarrow 0$

According to the above exemplary embodiment of the present invention, by using a 20-byte hash value and hash operation (which is 10,000 times faster than a digital signature algorithm), efficient and secure PKI environments can be constructed by additionally using a hash value without additional PKI elements or change in the PKI structure. Thus, when the present invention is commercialized, it can be applied to any wireless or wired environment using the OCSP-PKI.

As described above, according to the system and method for detecting exposure of an OCSP responder's session private key, in a PKI environment using D-OCSP, a reliable response can be provided to the client.

That is, since it is possible to detect an attacker sending a wrong response to a client using a snatched hash value when an OCSP responder's session private key is exposed to the attacker, exposure of the OCSP responder's session private key and abuse of the hash value can be fundamentally prevented, thereby providing a reliable OCSP response.

In addition, since security technology employing the present invention is safer and more efficient than the existing OCSP service in the PKI, use of the PKI can be expanded and reliable OCSP response service can be provided to users.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A system for detecting exposure of an OCSP responder's session private key in a D-OCSP-KIS to verify the status of a user's certificate online, comprising:
   a plurality of clients each including a processor which requests certificate status information;
   a plurality of OCSP responders each including a processor which receives the certificate status information request from the clients, sends a response, produces a hash value, and delivers the hash value to a certificate authority (CA) to get a certificate issued; and
   the CA including a processor which receives the hash value from the OCSP responders and issues the certificate to the OCSP responders in response to a certificate issue request;
   wherein each of the clients verifies a digital signature using a hash value contained in a certificate of at least one of the OCSP responders and a hash value contained in the response, and each of the clients stores a counter value for a hash operation in each verification and recognizes the response as valid when a current counter value is greater than a previous counter value; and wherein the OCSP responders compute the hash values by repetitively computing as many hash chains as the total number of clients, and deliver final values of the hash chains to the CA.

2. The system of claim 1, wherein when the current counter value is equal to or smaller than the previous counter value, each of the clients recognizes it as indicating exposure of an OCSP responder's session private key and abuse of the hash value.

3. The system of claim 1, wherein the hash value is a 20-byte value.

4. The system of claim 1, wherein the certificate issued from the CA contains information for indicating final hash values $X_{i,1,k}, \ldots, X_{i,m,k}$, a private key $PK_{res}$, a serial number SN of the certificate, a validity period V, an issuer I of the certificate, and an owner S of the certificate.

5. A method for detecting exposure of an OCSP responder's session private key in a D-OCSP-KIS to verify the status of a certificate using an OCSP in a PKI in a system in which a plurality of clients, a certificate authority (CA), and a plurality of OCSP responders are connected via a network, comprising the steps of:

computing hash values at the OCSP responders;
issuing certificates of the OCSP responders at the CA; and
verifying the status of a private key of at least one of the OCSP responders at each of the clients,
wherein each of the clients verifies a digital signature using a hash value contained in a certificate of at least one of the OCSP responders and a hash value contained in a response, and each of the clients stores a counter value for hash operation in each verification and recognizes the response as valid when a current counter value is greater than a previous counter value, and
wherein the step of computing the hash values at the OCSP responders comprises the steps of:
computing, at each of the OCSP responders, a hash value $X_K$ according to total number of times a signature is used by the OCSP responder;
repetitively computing as many hash chains as the total number of clients using a hash value $X_{i,j}$ according to a time for verification of each of the OCSP responders;
repetitively computing as many hash chains as (total number of OCSP responders×total number of clients) using a hash value $X_{i,j,k}$ of a time computed in each of the OCSP responders for distribution to each of the clients; and
storing all input hash values $X_{i,1,0}, \ldots, X_{i,m,0}$ of a time computed in each of the OCSP responders for distribution to each of the clients and intermediate hash values and delivering final values $X_{i,1,K}, \ldots, X_{i,m,K}$ to the CA.

6. The method of claim 5, wherein the step of issuing the certificates of the OCSP responders at the CA comprises the step of gathering the final values $X_{i,1,K}, \ldots, X_{i,m,K}$ from each of the OCSP responders and issuing as many OCSP responder's certificates as the total number of clients for distribution to the clients using its own private key.

7. The method of claim 5, wherein each of certificates of the OCSP responders issued from the CA contains information for indicating final hash values $X_{i,1,k}, \ldots, X_{i,m,k}$, a private key $PK_{res}$, a serial number SN of the certificate, a validity period V, an issuer I of the certificate, and an owner S of the certificate.

8. The method of claim 5, wherein the step for verifying the status the private key of the at least one of the OCSP responders comprises the steps of:

delivering a hash value $X_{i,j,k}$ of a time period computed in an OCSP responder for distribution to a client together with a response from the OCSP responder;
verifying a digital signature using the OCSP responder's certificate when the client is responded to by the OCSP responder; and
comparing the hash value $X_{i,j,k}$ contained in the response with the hash value $X_{i,j,k}$ contained in the OCSP responder's certificate to detect exposure of the OCSP responder's session private key.

9. The method of claim 8, wherein the step of comparing the hash value $X_{i,j,k}$ contained in the response with the hash value $X_{i,j,k}$ contained in the OCSP responder's certificate to detect exposure of the OCSP responder's session private key comprises the steps of:

performing a hash function once using the hash value $X_{i,j,k}$ included in the response;
storing $X_{temp}$ as the obtained hash value;
increasing a counter $C_{now}$ by 1;
comparing the hash value $X_{temp}$ with the hash value $X_{i,j,k}$ contained in the OCSP Responder i's certificate; and
checking whether or not the counter $C_{now}$ is identical to a counter $C_{before}$ +1, accepting the response if identical, and denying the response if not identical.

* * * * *